April 4, 1939.   B. A. SWENNES   2,152,932
DIFFERENTIAL CHANGE SPEED TRANSMISSION
Filed May 6, 1936
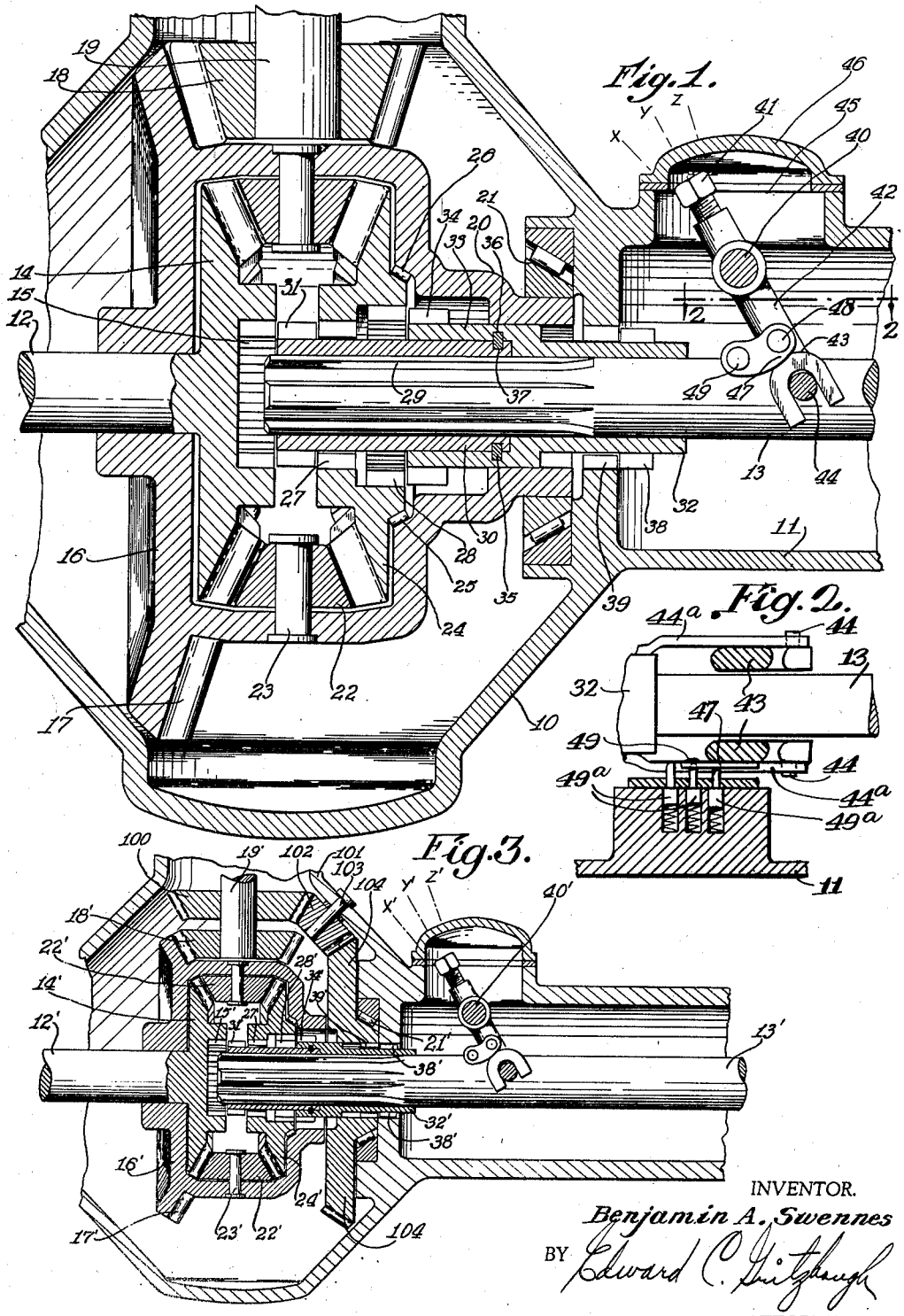
INVENTOR.
Benjamin A. Swennes
BY Edward C. Fitzhugh
ATTORNEY.

Patented Apr. 4, 1939

2,152,932

UNITED STATES PATENT OFFICE 2,152,932

DIFFERENTIAL CHANGE SPEED TRANSMISSION

Benjamin A. Swennes, Rockford, Ill., assignor to Borg-Warner Corporation, Chicago, Ill., a corporation of Illinois Application May 6, 1936, Serial No. 78,201

16 Claims. (Cl. 74—314)

This invention has to do with a planetary change speed power transmission, and relates particularly to a planetary type of gearing including a rotatable torque reaction member of which the movement may be controlled for changing the relative speed of the driving and driven parts of such transmission.

The differential rear axle gearing for contemporary motor vehicles comprises a bevelled pinion on each of the rear axle shafts in common engagement with a plurality of bevelled planetary pinions carried rotatively upon a planet carrier. The axle shafts are driven from a propeller or drive shaft carrying a pinion which meshes with a bevelled gear fixed with respect to said carrier. When both of the axles are rotating at the same speed, each of their bevelled gears acts as a reaction member for the other through the intervention of the pinions journalled upon the planet carrier so that said pinions are rotatively quiescent about their individual journals upon the carrier. Should one of the axles and its bevelled gear be rotated faster than the other, the planetary pinions will be rotated upon their journals whereby to permit of such relative rotation of the axle shafts.

If one of the axle shafts and its bevelled gear is held stationary, the bevelled gear serving as a reaction member, will cause the pinions to rotate while being planetated by the planet carrier, and at such a speed as to cause the other axle shaft to rotate at twice the speed at which it would rotate with respect to the driving propeller shaft were the shafts permitted to rotate at the same speed. The present invention includes means for controlling the movement of one of the bevelled gears of differential gearing independently of the shaft adapted to be driven by said bevelled gear and as a method of obtaining a selected speed ratio of the other axle shaft with respect to the drive shaft driving said gearing.

Another object of the present invention is the provision in a vehicle differential gearing of a novel means for disconnecting one of the axle shafts from its bevelled differential gear, connecting said shaft to the other axle shaft, and holding the disconnected gear against rotation so that said axle shafts will be caused to rotate at twice the usual speed with respect to the vehicle drive shaft.

A further object of the present invention is the provision in a vehicle differential gearing of a novel means for disconnecting one of the bevelled gears from its axle shaft and independently controlling the rotation of said bevelled gear whereby the other axle shaft may be driven at either an increased or a decreased speed with respect to the speed at which such shaft is normally rotated with respect to the vehicle drive shaft.

A full understanding will be had of the present invention upon reading the following description together with the accompanying single sheet of drawing hereby made a part of the specification, and wherein:

Fig. 1 is a sectional view taken centrally through a vehicle differential gearing upon a horizontal plane;

Fig. 2 is a fragmentary sectional view taken on the line 2—2 of Fig. 1; and

Fig. 3 is a view similar to Fig. 1 of a modified form of differential gearing embodying a different species of the present invention.

Like reference characters are used for designating corresponding parts shown throughout the drawing and described hereinafter.

Reference will first be had to Fig. 1, and particularly to the differential housing designated 10. Extending laterally (in opposite directions) from the differential housing 10 are axle housings 11 of which one is shown. Axially aligned axle shafts 12 and 13 are contained in the housings 11. Axle 12 has thereon a differential bevelled gear 14 and a jaw clutch 15. Journalled upon the axle 12 is a planetary gear carrier 16 carrying a large bevelled gear 17. The gear 17 is in mesh with a driving pinion 18, which is splined or otherwise suitably non-rotatively connected with a drive shaft 19. The drive shaft may be driven from a change speed gear box (not shown) according to standard practice.

An extension 20 of the planetary carrier 16 is journalled within a bearing element 21 secured to the transmission housing 10, said element coacting with the journalling of the carrier 16 upon the axle shaft 12 to insure stability of the carrier. A plurality of planetary pinions 22 are journalled upon shafts 23 disposed on the planetary carrier 16 radially of the common axis of shafts 12 and 13. Said pinions 22 mesh with the teeth upon the bevelled gear 14. Also meshing with the planetary pinions 22 is a floating bevelled gear 24 carried upon bearings 25, which are adapted to roll about a shoulder 26 formed upon the interior of the carrier 16. Two jaw clutches are formed upon the interior of floating gear 24, one of the jaw clutches being designated 27, and the other 28. It will be noted that the clutch 28 is of greater diameter than the clutch 27.

Splined at 29 upon axle shaft 13 is a sleeve 30 having thereon a jaw clutch member 31 adapted to be engaged either with the jaw clutch 15 or the jaw clutch 27. In Fig. 1 the jaw clutch member 31 is shown in the neutral position between clutches 15 and 27. A sleeve 32 is disposed rotatively upon the axle shaft 13, and has an enlarged end section 33 carrying a jaw clutch 34 adapted to be engaged with the jaw clutch 28. The enlarged section 33 of sleeve 32 carries internally a ring 35 within a circular groove 36, the ring 35 permitting of relative rotation between the sleeve 32 and the sleeve 30 upon which said ring is disposed in circular groove 37. By this construction the sleeve 32 is adapted to move the sleeve 30 axially of the shaft 13, whereby the clutch member 31 may be moved from the position shown in Fig. 1 to positions wherein it is engaged either with the clutch 15 or the clutch 27. Both the sleeve 30 and the axle shaft 13 are adapted to rotate with respect to the sleeve 32.

A jaw clutch 38 is formed upon the sleeve 32 near its right end and may be engaged with a fixed jaw clutch 39 upon the right end wall of the differential housing 10.

Actuating means for the axially shiftable sleeve 32 will now be described. Extending transversely of the axle housing 11 is a shaft 40 suitably journalled in said axle housing for rotative movement. Secured to the shaft 40 by means of a set screw 41 is a shifter fork 42 of which the legs 43 are bifurcated to adapt them to engage pins 44 on opposite sides of the axle shaft 13. The pins 44 have no connection with the axle shaft 13, but are anchored in arms 44a extending to the right from the shiftable sleeve 32. Thus, when the shaft 40 is oscillated between positions X, Y and Z, the sleeves 32 and 30 will be moved. Position X of the shaft 40 will be occupied incident to the clutch 31 being meshed with clutch 27, whereas position Z will be occupied by the shaft 40 when the clutch 31 is meshed with the clutch 15. Shaft 40 is shown in position Y, which corresponds to the neutral position of jaw clutch 31 with respect to clutches 15 and 27. Access to the sleeve shifting mechanism within the axle housing 11 may be had through a housing opening 45 which is normally closed by cover plate 46.

A resilient arm 47 is connected to one leg 43 of the yoke 42 by means of a pin 48. Said resilient arm 47 has a detent 49 therein adapted to receive and cooperate with a series of yieldingly mounted studs 49a extending from that part of the wall 11 shown in Fig. 2. The detent 49 engages a different one of such studs 49a, coincidentally with the shaft 40 being turned to positions X, Y or Z, and thus tends to maintain the shaft 40 in the one of such positions to which it has been moved.

The operation of that form of device shown in Figs. 1 and 2 will now be described.

Under normal driving conditions, that is, when it is desired to drive the vehicle at a cruising speed not in excess of say 40 miles an hour, the shaft 40 will be moved into position X, whereby the sleeve 32 coacting through the ring 35 slides the sleeve 30 to the right for bringing the jaw clutch 31 into mesh with the clutch 27. In this manner, the floating bevelled gear 24 is directly connected to the axle shaft 13. Concurrently, clutches 34 and 38 are withdrawn further to the right from clutches 28 and 39 with which they are respectively adapted to engage. While operating with the various clutches in the position just described, the differential gearing will function in the manner of conventional differential gearing devices. The driving pinion 18 will cause the bevelled gear 17 and the planet carrier 16 to rotate in a clockwise direction with respect to a view taken from the right in Fig. 1. Because of substantially equal torque or load upon the axle shafts 12 and 13, there will be an equal reactive force applied by the bevelled gears 14 and 24 upon the opposite sides of the toothed peripheries of the planetary pinions 22, so that said pinions will simply act as keys and cause the bevelled gears 14 and 24 and the two axle shafts 12 and 13 to which the latter are connected to rotate at the same speed. The planetary gears 22, however, are adapted to cause torque to be delivered to the axle shafts 12 and 13 in the conventional manner while they are rotating at different speeds.

Should it be desired to rotate the axle shafts 12 and 13 at an overspeed with respect to the drive shaft 19, the operator of the vehicle will rotate the control shaft 40 from position X to position Z to shift the jaw clutch 31 into mesh with jaw clutch 15. Concurrently, the clutch 34 is meshed with clutch 28, and the clutch 38 is meshed with clutch 39. Such rotation of the control shaft causes coengagement of clutches 31 and 15 to effect a direct connection between axles 12 and 13, and coengagement of clutches 28 and 34 and clutches 38 and 39 to establish a coupling between the floating bevelled gear 24 and the differential housing 10. As a consequence of the latter connection or coupling, the floating bevelled gear 24 will be held against rotation. When the planetary gear carrier 16 is now rotated, the planet gears 22 will be spun upon their journals 23, thus giving them a peripheral movement additive to their planetary movement for driving the bevelled gear 14. As a consequence, the bevelled gear 14, the shaft 12 and the shaft 13 connected to shaft 12 by jaws 15 and 31 will be doubled in speed ratio with respect to the propeller shaft 19.

Attention is now invited to that form of the invention shown in Fig. 3, where parts corresponding to those shown in Fig. 1 are designated by the same reference characters but with a prime added. The differential change speed gearing shown in Fig. 3 is adapted to cause the axle shafts 12' and 13' to rotate at an overspeed with respect to the propeller shaft 19', but at a speed less than twice the speed at which they are driven, with respect to the propeller shaft 19', through the device when it is operating as an ordinary differential gearing.

The propeller shaft 19' in addition to carrying a driving pinion 18' carries a driving pinion 100. The differential casing 10' is modified by being enlarged at a section 101 for the accommodation of a bevelled idler gear 102 meshing with pinion 100 and journalled upon a stub shaft 103. Meshing with the opposite side of the idler gear 102 is a large bevelled gear 104 journalled in a roller bearing 21', which is carried in the housing 10'. It will be noted that the bevelled gear 104 is of greater diameter than the bevelled gear 17' in order that the gear 104 will be rotated at the slower speed of the two. Since it is of greater diameter than bevelled gear 17', it cannot be driven from pinion 18' but requires the separate driving pinion 100. It is understood that bevelled idler gear 102 serves merely to reverse the direction of rotation of the driven gear 104 from that which it would assume if directly connected to a driving pinion mounted on shaft 19', and hence its size and location are determined in the usual manner for idler gears. The gear 104 carries upon its inner periphery a jaw clutch 39' which is adapted to be engaged by the clutch 38' upon the slidable sleeve 32'. That part of the planetary gear carrier 16' extending to the right has been cut off so as to accommodate the ring gear 104 not present in the embodiment shown in Fig. 1.

Operation of the device is very similar to that of the device shown in Figs. 1 and 2. Ordinary cruising speed of the vehicle incident to normal differential action of the differential device is had when the control shaft 40' is in position X'; the device is in neutral when the control shaft 40' is in position Y'; and an overspeed is obtained when the control shaft 40' is moved to position Z'. Particularly is attention directed to the operation of the device when the control shaft is in position Z'. Clutch 31' will be meshed with clutch 15', whereby the axle shafts 12' and 13' are coupled directly together. The floating bevelled ring gear 24' will be coupled directly to the floating ring gear 104 by the connection of clutch 34' with clutch 28' and by the connection of clutch 38' with clutch 39'. Because of the driving connection between the propeller shaft 19' and the bevelled ring gear 104, the sleeve 32' and the floating ring gear 24' will be caused to rotate clockwise with respect to a view taken from the right in Fig. 2. Rotation of the gear 24' will be at a somewhat less angular velocity than that of the planetary gear carrier 16', and consequently there will be a drifting movement of the planet shafts 23' clockwise with respect to the gear 24' and consequently a spinning movement of the planet pinions 22' upon the shafts 23'. The bevelled gear 14' will, therefore, be caused to rotate at a speed in excess of that of the planet carrier 16'.

The speed at which the bevelled gear 14' and the axle shafts 12' and 13' fixed rigidly therewith rotate with respect to the propeller shaft 19' may be changed by changing the relative diameter of gears 100 and 104. That is, it will be conceived that the floating bevelled ring gear 24' functions as a reactive member for the planetary gearing, while the control shaft is in position Z', and that the speed of the shafts 12' and 13' is a function of the rotative speed of such reactive member. Hence, by changing the speed ratio of the gearing connection between the drive shaft 19' and the reaction member 24', the speed ratio between the said drive shaft and the axle shafts 12' and 13' may also be changed.

Although the description and drawing have been restricted to specific illustrative structural embodiments, it will be understood that the invention may extend to numerous modifications falling within the scope of the appended claims.

I claim:

1. Change speed mechanism comprising a driving pinion carrier, pinions journalled on said carrier, coaxial driven shafts, gears driven by said pinions and meshing with opposite sides thereof, one of said gears being in driving relation with one of said shafts, the other of said gears being in demobilizable driving relation with the other of said shafts, means for demobilizing said driving relation while establishing a driving connection between said other shaft and the first mentioned gear, and means for rotating said other gear at a speed different from the said one gear subsequent to demobilization of said driving relation.

2. In a differential change speed transmission, aligned axle shafts, a gear on one of said shafts, a pinion in driving mesh with said gear and planetatable about the axes of said shafts, a power-driven carrier having said pinion rotatably thereon and the speed of such rotation determining the speed of said shaft, a reaction member in operative connection with said pinion, said carrier and said reaction member being rotatable at relatively different speeds whereby to cause rotation of said pinion at different speeds, said reaction member being connectible with the other of said shafts to effect one relative speed between said member and said carrier, and other means to which said reaction member is connectible to effect a different relative speed therebetween and said carrier.

3. In a differential change speed transmission, aligned axle shafts, a gear on one of said shafts, a power-driven planet gear carrier rotatable coaxially with said shafts, a planetary pinion rotatable on said carrier about an axis normal to said shafts, said pinion being in driving mesh with said gear and rotatable at different speeds to cause different rotative speeds of said gear and said shaft, a reaction member adapted to rotate said pinion, said reaction member and said carrier being rotatable at relatively different speeds to cause rotation of said pinion at different speeds, said reaction member being connectible with the other of said shafts to effect one relative speed between said member and said carrier, and other means to which said reaction member is connectible to effect a different relative speed therebetween and said carrier.

4. In a differential change speed transmission, aligned axle shafts, a gear on one of said shafts, a power-driven planet gear carrier rotatable coaxially with said shafts, a planetary pinion rotatable on said carrier about an axis normal to said shafts, said pinion being in driving mesh with said gear and rotatable at different speeds to cause different rotative speeds of said gear and said shaft, a reaction member adapted to rotate said pinion, said reaction member and said carrier being rotatable at relatively different speeds to cause rotation of said pinion at different speeds, said reaction member being rotatably connectible with the other of said shaft to effect one relative speed between said member and said carrier, additional means rotating at a different speed than said other shaft, and means for connecting said reaction member to said additional rotating means to effect a different relative speed between said reaction member and said carrier.

5. In a differential change speed transmission, aligned axle shafts, a gear on one of said shafts, a rotatable power-driven planet gear carrier, a planetary pinion rotatable on said carrier, said pinion being in driving mesh with said gear and rotatable at different speeds to cause different rotative speeds of said gear and said shaft, a reaction member adapted to rotate said pinion, said reaction member and said carrier being rotatable at relatively different speeds to cause rotation of said pinion at different speeds, said reaction member being connectible with the other of said shafts to effect one relative speed between said member and said carrier, and other means to which said reaction member is connectible to effect a different relative speed therebetween and said carrier.

6. A differential gearing apparatus comprising a rotatable planet gear carrier, a planet gear journalled on said carrier, pinions meshing with opposite sides of said planet gear, a first driven shaft associated with one of said pinions in such a manner as to be driven therefrom, a second driven shaft, a fixed clutch means, and clutch means shiftable axially of said second driven shaft, said shiftable clutch means being effective in one position to clutch the other of said pinions in driving relation with the second driven shaft, and effective in another position to clutch said second shaft in driving relation with said one pinion while coupling said other pinion with said fixed clutch means.

7. A differential gearing apparatus comprising a rotatable planet gear carrier, a planet gear journalled on said carrier, pinions meshing with opposite sides of said planet gear, a first shaft adapted to be driven by one of said pinions, a second shaft releasably connectible with the other of said pinions, a power driving member rotatable at a speed differing from that of the carrier, and means for connecting the other of said pinions with said power driving member when said pinion is disconnected from the second driven shaft.

8. A differential gearing apparatus comprising a rotatable planet gear carrier, a planet gear journalled on said carrier, pinions meshing with opposite sides of said planet gear, a driven shaft adapted to receive driving power from one of said pinions, a driven shaft releasably connectible with the other of said pinions and adapted to receive driving power therefrom when so connected, a power driving member rotatable at a speed in excess of that of the planet gear carrier, and means for connecting said other pinion with said power driving member when the disconnectible driven shaft is disconnected from said other pinion.

9. A differential gearing apparatus comprising a rotatable planet gear carrier, a planet gear journalled on said carrier, pinions meshing with opposite sides of said planet gear, a driven shaft adapted to receive driving power from one of said pinions, a second driven shaft, a power driving member rotatable at a speed less than that of said planet gear carrier, and means for alternately connecting the other of said pinions with the second driven shaft and with said power driving member.

10. A differential gearing apparatus comprising a rotatable planet gear carrier, a planet gear journalled on said carrier, pinions meshing with opposite sides of said planet gear, a driven shaft adapted to receive driving power from one of said pinions, a second driven shaft, a power driving member rotatable at a speed differing from that of said planet carrier, and means for alternately connecting the other of said pinions with the second driven shaft and with said power driving member.

11. Change speed power transmission apparatus comprising a driving shaft, driven shafts, differential gearing adapted to drive said shafts from said driving shaft at a plurality of speed ratios and including a planet gear carrier, a planet gear on said carrier, driven gears each coaxially mounted with respect to a different shaft and connectable in driving relation to one of said driven shafts, said driven gears being in mesh with said planet gear on opposite sides thereof, and means operable for connecting one of said driven gears in driving relation with said one of said driven shafts incident to disconnecting the other driven gear from its driven shaft and holding said disconnected gear against rotation.

12. Differential gearing mechanism comprising rotatable driven shafts, a power driven planetary pinion carrier, pinions on said carrier, gears each coaxially mounted with respect to a different driven shaft and connectable in driving relation to one of said driven shafts, said gears meshing with said pinions on opposite sides thereof, and means operable to connect said shafts for unitary drive from one of said gears while disconnecting the other of said gears from its shaft and controlling rotation of said disconnected gear independently of the rotation of said shaft.

13. Change speed mechanism comprising a driving pinion carrier, a pinion journalled on said carrier, driven shafts, gears driven by said pinion and meshing with opposite sides thereof, each of said gears being coaxially mounted with respect to a different driven shaft and connectable in driving relation to one of said driven shafts, means providing for a driving connection between one of said gears and said shafts and disconnection of the other gear from its shaft, and additional means for controlling said other gear subsequent to its disconnection.

14. In a differential change speed transmission, aligned axle shafts, opposed driven gears, each coaxially mounted with respect to a different axle shaft and connectable in driving relation to one of said shafts, pinions interposed between said gears in driving mesh therewith, a rotatable power driven carrier for said pinions, clutch means adapted when in one position to establish the driving relation between one of said gears and the shaft driven therefrom and when in another position to terminate such driving relation and connect said shafts for common rotation, and clutch means operable to hold said one gear against rotation while the first named clutch means connects said shafts.

15. Change speed mechanism comprising a driven shaft, a planetary gear set including a driven gear in driving relation with said driven shaft, a planet gear meshed with said driven gear, a rotatable carrier for said planet gear, and a rotatable reaction gear member also in mesh with said planet gear, means for rotating said carrier, additional reaction member driving means rotatable at a peripheral linear speed different from the peripheral linear speed of said reaction gear member, and clutch means for selectively coupling said driving means with said reaction member.

16. Change speed mechanism comprising a driven shaft, a planetary gear set including a driven gear in driving relation with said driven shaft, a planet gear meshed with said driven gear, a rotatable carrier for said planet gear, and a rotatable reaction gear member also in mesh with said planet gear, means for rotating said carrier, additional reaction member driving means coaxially rotatable at a peripheral linear speed different from the peripheral linear speed of said reaction gear member, and clutch means shiftable axially of said driving means for individually coupling the driving means with said reaction member.

BENJAMIN A. SWENNES.